United States Patent
Goyal

(10) Patent No.: US 9,875,402 B2
(45) Date of Patent: Jan. 23, 2018

(54) DIGITAL IMAGE MANIPULATION

(71) Applicant: Microsoft Technology Licensing, LLC, Redmond, WA (US)

(72) Inventor: Ankur Goyal, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/591,070

(22) Filed: May 9, 2017

(65) Prior Publication Data
US 2017/0243059 A1     Aug. 24, 2017

Related U.S. Application Data

(63) Continuation of application No. 14/685,794, filed on Apr. 14, 2015, now Pat. No. 9,684,825.

(51) Int. Cl.
| | | |
|---|---|---|
| *G06K 9/00* | (2006.01) | |
| *G06Q 30/06* | (2012.01) | |
| *G06Q 50/12* | (2012.01) | |

(52) U.S. Cl.
CPC ..... *G06K 9/00469* (2013.01); *G06K 9/00449* (2013.01); *G06Q 30/0623* (2013.01); *G06Q 50/12* (2013.01); *G06K 2209/01* (2013.01)

(58) Field of Classification Search
CPC ........... G06K 9/00449; G06K 9/00469; G06K 2209/01; G06F 3/0484; G06Q 30/0623; G06Q 50/12
USPC .............................. 382/175, 224, 309, 310
See application file for complete search history.

(56) References Cited

U.S. PATENT DOCUMENTS

| | | | |
|---|---|---|---|
| 7,416,131 B2 * | 8/2008 | Fortune | G06K 9/00449 235/375 |
| 7,590,932 B2 | 9/2009 | Britton et al. | |
| 8,234,219 B2 | 7/2012 | Gorczowski et al. | |
| 8,345,921 B1 | 1/2013 | Frome et al. | |
| 8,521,757 B1 | 8/2013 | Nanda et al. | |

(Continued)

OTHER PUBLICATIONS

"CamScanner Free| PDF Document Scanner and OCR", Retrieved from <<https://itunes.apple.com/in/app/camscanner-free-pdf-document/id388627783?mt=8>>, Retrieved on: Feb. 3, 2015, 3 pages.

(Continued)

*Primary Examiner* — Daniel Mariam
(74) *Attorney, Agent, or Firm* — Law Offices of Richard Chi; Richard Chi

(57) ABSTRACT

Techniques for assigning context to a digitally captured image, and for manipulating recognized data fields within such image. In an exemplary embodiment, a context of an image may be assigned based on, e.g., user input or pattern recognition. Based on the assigned context, recognized data fields within the image may be manipulated according to context-specific processing. In an aspect, processing specific to a sales receipt context may automatically manipulate certain data, e.g., calculate updated sales tax and subtotals based on user-designated fields, and display the automatically calculated data in an output receipt. Fields not designated by the user may be selectively concealed in the output receipt for privacy. Further aspects disclose processing techniques specific to other contexts such as restaurant menu, store shelf, and fillable form contexts.

20 Claims, 14 Drawing Sheets

(56) References Cited

U.S. PATENT DOCUMENTS

| | | | |
|---|---|---|---|
| 8,744,143 | B2 | 6/2014 | Chen |
| 9,116,888 | B1 | 8/2015 | Wang et al. |
| 9,148,431 | B2 | 9/2015 | Chmaytelli |
| 2004/0044951 | A1 | 3/2004 | Repko et al. |
| 2005/0216836 | A1 | 9/2005 | Duke et al. |
| 2008/0144881 | A1 | 6/2008 | Fortune et al. |
| 2008/0152209 | A1 | 6/2008 | Kosek et al. |
| 2011/0191259 | A1* | 8/2011 | Robinson ............ G06Q 20/102 705/342 |
| 2011/0202968 | A1 | 8/2011 | Nurmi |
| 2013/0004090 | A1 | 1/2013 | Kundu et al. |
| 2013/0108105 | A1 | 5/2013 | Yoo et al. |
| 2013/0124414 | A1 | 5/2013 | Roach et al. |
| 2013/0124961 | A1 | 5/2013 | Linburn |
| 2014/0196152 | A1 | 7/2014 | Ur et al. |
| 2014/0258838 | A1 | 9/2014 | Evers et al. |
| 2015/0178322 | A1 | 6/2015 | Smietanka et al. |

OTHER PUBLICATIONS

"Smart OCR—Features", Retrieved from <<http://www.smartocr.com/features.htm>>, Jun. 25, 2011, 1 Page.

"Smart OCR: Text Miner", Retrieved from <<https://web.archive.org/web/20150428081307/https://play.google.com/store/apps/details?id=com.appstyle.gosmartocr&hl=en>>, Jan. 13, 2015, 2 Pages.

"Smart PDF Editor Features", Retrieved from <<https://smart-soft.net/products/smart-pdf-editor/features.htm>>, Jun. 17, 2013, 1 Page.

"Final Office Action Issued in U.S. Appl. No. 14/685,794", Dated: Nov. 21, 2016, 14 Pages.

"Non Final Office Action Issued in U.S. Appl. No. 14/685,794", Dated: May 31, 2016, 13 Pages.

"Notice of Allowance Issued in U.S. Appl. No. 14/685,794", Dated: Feb. 21, 2017, 8 Pages.

Boyle, et al., "The Language of Privacy: Learning from Video Media Space Analysis and Design", In Proceedings of ACM Transactions on Computer-Human Interaction, vol. 12, Issue 2, Jun. 1, 2005, pp. 328-370.

Cao, et al., "Multi-User Interaction Using Handheld Projectors", in Proceedings of the 20th Annual ACM Symposium User Interface Software and Technology, Oct. 7, 2007, 10 Pages.

Chen, et al., "Shreddr: Piplelined Paper Digitization for Low-Resource Organization", In Proceedings of the 2nd ACM on Computing for Development, Mar. 11, 2012, 10 Pages.

Greenberg, et al., "The Notification Collage: Posting Information to Public and Personal Displays", In Proceedings of the SIGCHI Conference on Human Factors in Computing Systems, vol. 3, Issue 1, Mar. 31, 2001, pp. 514-521.

Gutwin, et al., "Supporting Informal Collaboration in Shared-Workspace Groupware", In Journal of Universal Science, vol. 14, Issue 9, May 1, 2008, 23 Pages.

Kim, et al., "Hugin: A Framework for Awareness and Coordination in Mixed-Presence Collaborative Information Visualization", In Proceedings of the ACM International Conference on Interactive Tabletops and Surfaces, Nov. 7, 2010, pp. 231-240.

Mao, et al., "A Model-Based Form Processing Sub-System", In Proceedings of the 13th International Conference on Recognition, Aug. 25, 1996, 5 Pages.

Mao, et al., "A System for Automatically Reading IATA Flight Coupons", In Proceedings of the 4th International on Document Analysis and Recognition, Aug. 18, 1997, 5 Pages.

McEwan, et al., "Supporting Social Worlds with the Community Bar", In Proceedings of the International ACM Conference on Supporting Group Work, Nov. 6, 2005, 10 Pages.

Tee, et al., "Providing Artifact Awareness to a Distributed Group through Screen Sharing", In Proceedings of 20th Conference on Computer Supported Cooperative Work, Nov. 4, 2006, pp. 99-108.

"International Search Report and Written Opinion Issued in PCT Application No. PCT/US2016/027006", Dated: 25, 2016, 13 Pages.

"Second Written Opinion Issued in PCT Application No. PCT/US2016/027006", Dated: Mar. 28, 2017, 5 Pages.

"International Preliminary Report on Patentability Issued in PCT Application No. PCT/US2016/027006", Dated: 23, 2017, 10 Pages.

* cited by examiner

ABC Store ~ 110

Seattle 09 ~ 120
123 Main St.
Seattle, WA 98101

| 132 | 134 | 136 |
|---|---|---|
| #101 | Eggs | 5.99 |
| #423 | Carrots | 4.99 |
| #089 | Milk | 2.99 |
| #273 | Batteries 138 | 6.99 |
| #152 | Grapes | 2.99 |

} 130

Subtotal      23.95 ~ 140
9.5% Tax      2.28 ~ 142
Total         26.23 ~ 144
Credit card   26.23 ~ 146

XXXX XXXX XXXX 1987            ~ 150
02/23/14    15:50
Seq#:012345         App#:143567
Credit Card Type    Tran ID:14245677
Merchant ID 0438527614

Approved – Purchase    ~ 160
Amount - $26.23
0001 425 00000000123 4678

FIG 1

ABC Store ~410

Seattle 09
123 Main St.
Seattle, WA 98101 ~420

422   424   426

| #101 | Eggs | 5.99 | ~430 |
| #423 | Carrots | 4.99 | ~432 |
| #089 | Milk | 2.99 | ~434 |
| #273 | Batteries | 6.99 | ~436 |
| #152 | Grapes | 2.99 | ~438 |

Subtotal        23.95  ~440
9.5% Tax         2.28  ~442
Total           26.23  ~444
Credit card     26.23  ~446

XXXX XXXX XXXX 1987
02/23/14    15:50
Seq#:012345              App#:143567
Credit Card Type         Tran ID:14245677
Merchant ID 0438527614
~450

Approved – Purchase  ~460
Amount - $26.23  ~462
0001 425 00000000123 4678  ~464

FIG 4

| | |
|---|---|
| ABC Store | 410 ☑ 510 |
| Seattle 09<br>123 Main St.<br>Seattle, WA 98101 | 420 ☑ 520 |

| | | | | |
|---|---|---|---|---|
| #101 | Eggs | 5.99 | 430 | ☐ 530 |
| #423 | Carrots | 4.99 | 432 | ☐ 532 |
| #089 | Milk | 2.99 | 434 | ☐ 534 |
| #273 | Batteries | 6.99 | 436 | ☑ 536 |
| #152 | Grapes | 2.99 | 438 | ☐ 538 |

| | | | |
|---|---|---|---|
| Subtotal | 23.95 | 440 | ☑ 540 |
| 9.5% Tax | 2.28 | 442 | ☑ 542 |
| Total | 26.23 | 444 | ☑ 544 |
| Credit card | 26.23 | 446 | ☐ 546 |

XXXX XXXX XXXX 1987
02/23/14   15:50
Seq#:012345          App#:143567
Credit Card Type     Tran ID:14245677
Merchant ID 0438527614

450   ☐ 550

| | | |
|---|---|---|
| Approved – Purchase | 460 | ☐ 560 |
| Amount - $26.23 | 462 | ☐ 562 |
| 0001 425 00000000123 4678 | 464 | ☐ 564 |

FIG 5

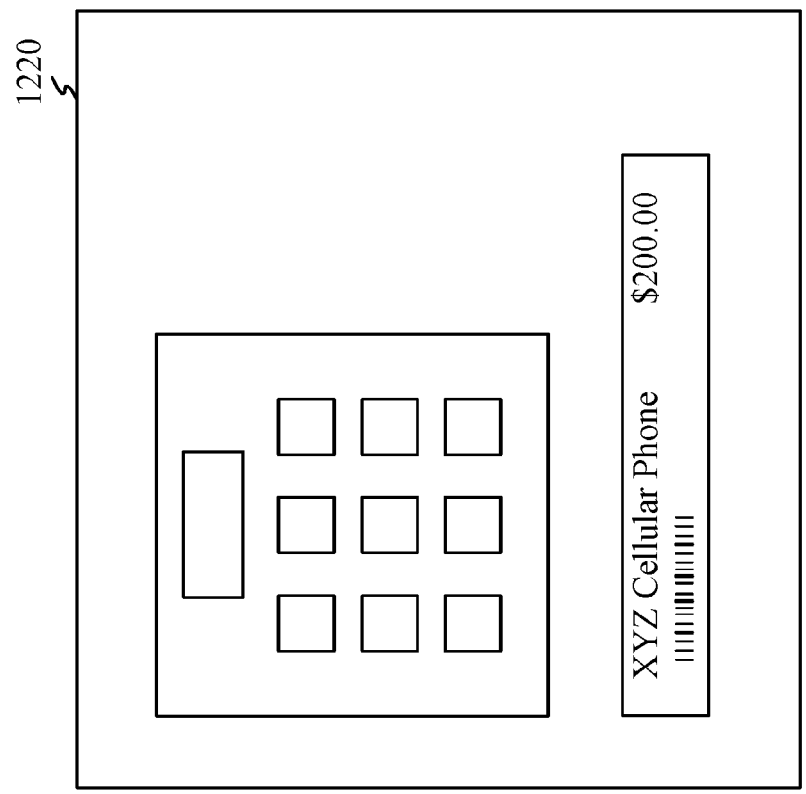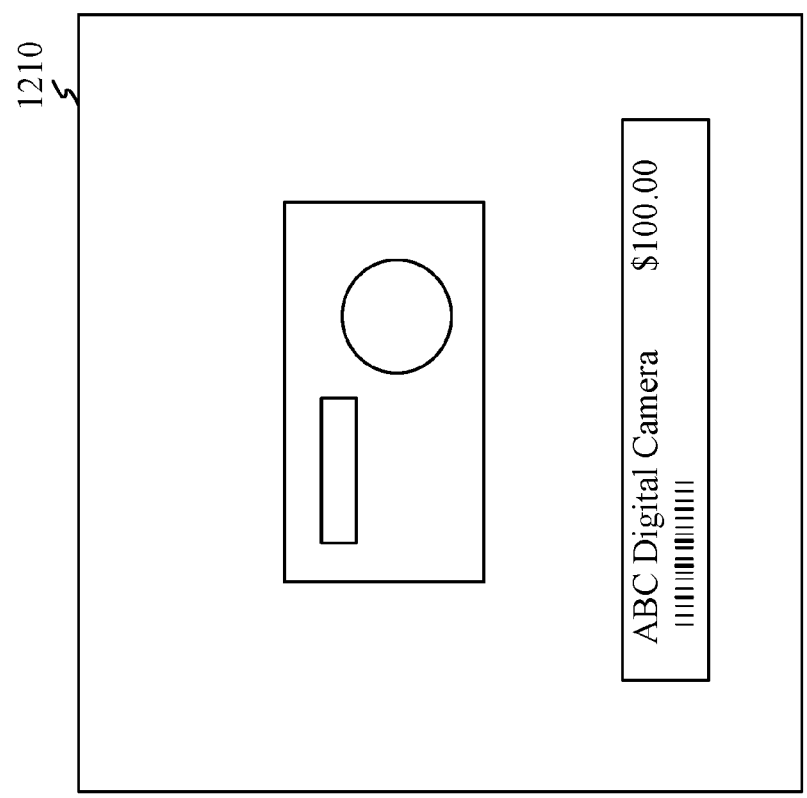
FIG 12

DIGITAL IMAGE MANIPULATION

BACKGROUND

Digital image capture technologies have seen widespread use in consumer devices. Utilizing Optical Character Recognition (OCR), such technologies are capable of recognizing certain limited content, such as the presence of text characters, in the digitally captured images. However, current technologies do not offer users the flexibility to manipulate or post-edit the recognized content in a manner customized to the content of the image.

For example, if a document such as an itemized store receipt is digitally captured, current OCR software may identify text on the receipt, but may not automatically provide the user with capabilities to manipulate text items, re-calculate sales tax and price information based on the manipulation, or otherwise perform receipt-specific functions that would be convenient to the user. Similarly, other types of captured images such as restaurant menus, fillable forms, etc., may contain content-specific information that is not easily manipulated or post-edited using current technologies.

Accordingly, it would be desirable to provide novel and efficient techniques to assign context to an image based on the image content, and to provide flexible and context-specific options for a user to manipulate recognized data fields in the image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, various aspects of the subject matter described herein are directed towards techniques for assigning context to a digital image, and providing context-specific options to a user to manipulate data fields identified in the digital image. In certain aspects, the context of a digital image may be assigned based on user input, or based on automatic pattern recognition techniques performed by an image processing system. Based on the assigned context, various context-specific options may be provided to the user for manipulating data, e.g., editing or obscuring certain recognized data fields in the image, calculating or re-calculating the values of certain fields based on operations commonly performed for the given contexts, etc. The output of the manipulation may be generated as a post-processed image in any of a plurality of user-selected formats.

Other advantages may become apparent from the following detailed description and drawings.

BRIEF DESCRIPTION OF THE DRAWINGS

FIG. 1 illustrates an instance of a receipt that may be digitally captured and manipulated according to techniques of the present disclosure.

FIGS. 4-8 further show illustrative diagrams of recognition and manipulation that may be performed by the image processing system for a receipt context.

FIGS. 11-13 illustrate an alternative exemplary embodiment of the present disclosure showing processing that may be performed specifically for a "store shelf" context.

DETAILED DESCRIPTION

Figure 2:
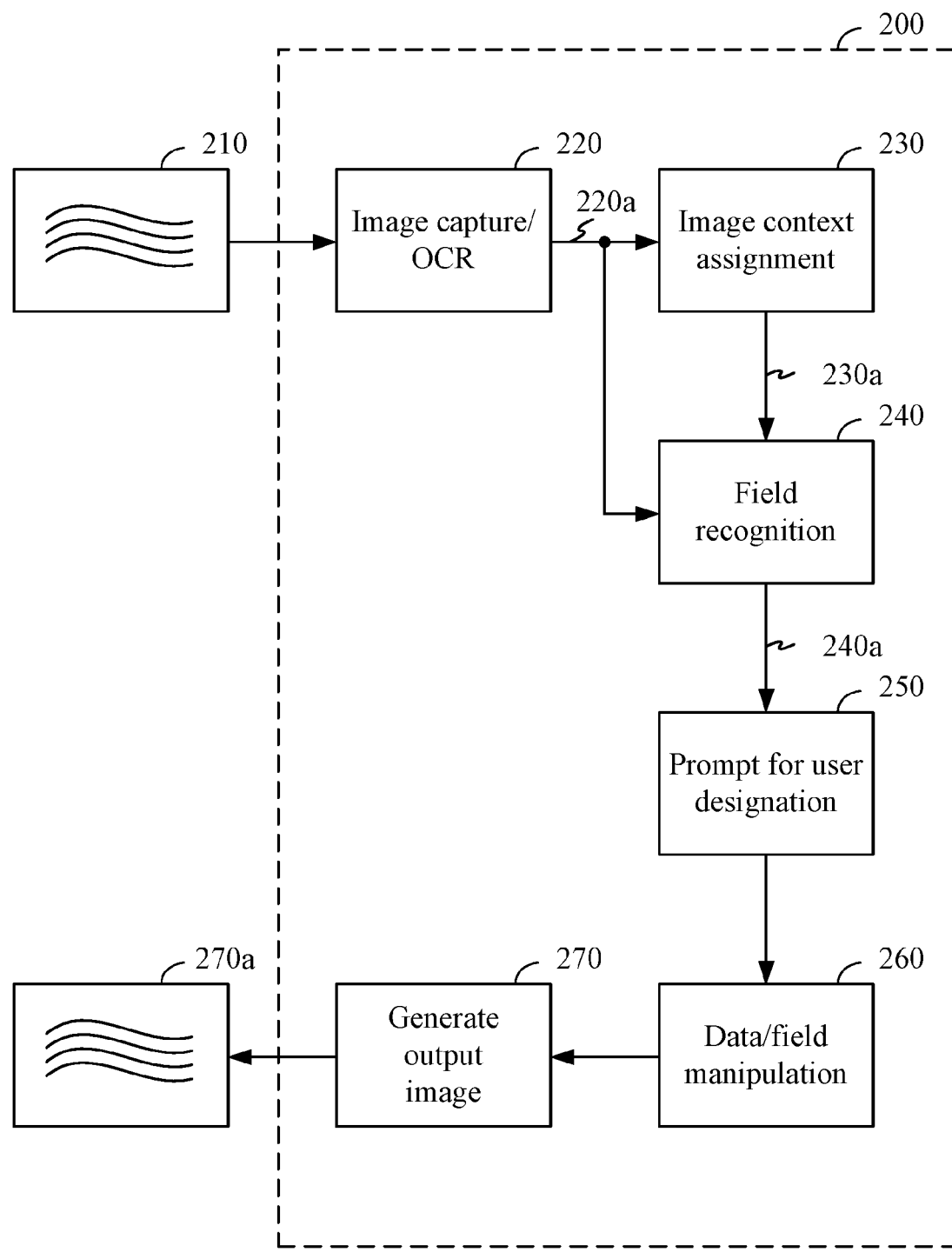
FIG. 2 shows an exemplary embodiment of an image processing system according to the present disclosure.

Various aspects of the technology described herein are generally directed towards techniques for processing digital images. It will be appreciated that certain features of the techniques described below may also be used for any types of image field recognition and manipulation. The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

FIG. 1 illustrates an instance of a receipt 100 that may be digitally captured and manipulated according to techniques of the present disclosure. It will be understood that receipt 100 is only shown to illustrate certain aspects of the present disclosure, and is not meant to limit the scope of the present disclosure to any particular types of documents or images that can be processed using the techniques disclosed herein.

In FIG. 1, receipt 100 illustratively shows items purchased at a grocery store. In particular, receipt 100 contains text 110 corresponding to the store name, and text 120 corresponding to the address of the store underneath text 110, adopting a layout that may be commonly found in store receipts. Item 130 shows a listing of all items that were purchased, and is formatted in tabular form, with three columns 132, 134, 136. In the exemplary receipt 100 shown, column 132 shows store-assigned identification numbers of the items, column 134 shows the names of the purchased items, and column 136 shows the corresponding prices of the items.

A subtotal line 140 shows a subtotal computed as the sum of the item prices in column 136. Based on the subtotal, a sales tax is computed using a sales tax rate (illustratively shown as 9.5% in FIG. 1) multiplied by the subtotal, and is shown in sales tax line 142. The total line 144 contains the total amount due corresponding to the sum of the subtotal and sales tax. Payment method line 146 indicates the particular type of payment used in this transaction. Text 150 and 160 further show other information related to the credit card transaction, including credit card number used, sales and merchant identification, etc.

It will be appreciated that certain technologies exist to digitally capture a document such as receipt 100, and subsequently recognize certain text characters in the digitally captured image, e.g., using optical character recognition (OCR). However, such technologies may not allow the user to perform certain editing or processing functions that are specific to the type of image captured. For example, when an image such as receipt 100 is digitally captured, OCR software may recognize text that is present in the image, but may not have the capability to identify the image as corresponding to a sales receipt. Accordingly, such software may not offer the user any options for processing the image that are specifically tailored to the context of a sales receipt.

For example, in one usage scenario, a user who purchased the items in receipt 100 may in fact have purchased one of the items, e.g., batteries 138, for a friend. In this case, the user may want to generate a modified copy of receipt 100 showing only the batteries 138, with corresponding subtotal, tax, and total fields calculated specifically for batteries 138. Furthermore, to preserve privacy, the user may desire to redact or excise certain other fields of the receipt from the modified copy, e.g., the credit card information or the identity of other items purchased on the same shopping trip. Current technologies do not allow a user to perform context-specific manipulation on the recognized fields of a digital image in this manner.

Accordingly, it would be desirable to provide techniques for designing a context-specific digital image processing system that provides users with options that are automatically tailored to the specific type of image captured.

FIG. 2 shows an exemplary embodiment 200 of an image processing system according to the present disclosure. Note FIG. 2 is shown for illustrative purposes only, and is not meant to limit the scope of the present disclosure to any particular implementations or combinations of features described herein. For example, in alternative exemplary embodiments (not shown in FIG. 2), a system may include only a subset of the functional blocks shown in FIG. 2, and/or include additional blocks not explicitly shown in FIG. 2. Such alternative exemplary embodiments are contemplated to be within the scope of the present disclosure.

In FIG. 2, system 200 includes an image capture/OCR block 220 for generating a digital image 220a corresponding to a target object 210. In certain exemplary embodiments, block 220 may also incorporate OCR functionality to identify text that is present in digital image in the target object 210. For example, target object 210 may be a receipt 100 such as described with reference to FIG. 1, and image 220a may correspond to a digitally captured version of receipt 100. It will be appreciated that target object 210 may generally correspond to any types of items, including, but not limited to, a menu, a picture containing graphics, a fillable text form, etc.

Note while certain aspects of the present disclosure are described with reference to target objects 210 containing text, the techniques disclosed herein may also be readily applied to target objects that do not contain text, e.g., graphical images, etc. Such alternative exemplary embodiments are contemplated to be within the scope of the present disclosure.

Digital image 220a is provided to image context assignment block 230 (also denoted herein as a "context assignment block"), which assigns an appropriate context 230a to digital image 220a. For example, block 230 may assign a context selected from a plurality of predetermined contexts such as "receipt," "menu," "tax form," etc., to digital image 220a, depending on the content of target object 210.

Block 230 may determine the appropriate context for digital image 220a using any of a plurality of techniques. In an exemplary embodiment, system 200 may prompt the user to specify the context, and/or the user may directly specify the context of the image when the digital image 220a is captured by block 220. For example, the user may specify that target object 210 is a "receipt" by selecting a choice from a drop-down menu in a graphical user interface provided by system 200, e.g., using a keyboard, mouse, stylus, tap, etc. In an alternative exemplary embodiment, system 200 may determine the context of target object 210 by applying pattern recognition techniques to, e.g., recognize certain characters and formatting patterns within the image as corresponding to characters and patterns commonly found in receipts, menus, etc., and thereby assign a correct context to image 220a. It will be appreciated that pattern recognition techniques may include, e.g., correlating text or other formatting data recognized using OCR in digital image 220a with a plurality of predetermined context-specific templates, and determining which template has the closest "match."

Digital image 220a and corresponding context 230a are further input to a field recognition block 240. Block 240 recognizes one or more distinct data fields in digital image 220a as corresponding to certain types of fields commonly found in documents sharing context 230a. In an exemplary embodiment, block 240 may access a database of templates corresponding to various known contexts, and compare the digital image 220a to templates sharing the context 230a to classify and identify various fields in image 220a. For example, for store receipts such as receipt 100, various templates corresponding to a "receipt" context 230a may contain formatting wherein a store name such as text 110 is followed directly by store address such as text 120, with both fields found at the top of the image.

Note the fields to be recognized may include, but are not limited to, e.g., store identification text, item prices, images, barcodes, graphical layouts and formats, design patterns, etc. In an exemplary embodiment, the fields to be recognized may be specific to the context. In alternative exemplary embodiments (not shown in FIG. 2), field recognition at block 240 may alternatively be performed without explicitly referencing the assigned context 230a of the image. For example, if the OCR performed at block 220 is performed on a target object 210 having text fields that are already explicitly marked (e.g., explicit text such as "apple price: $2.00"), then no a priori knowledge of an assigned context 230a may be necessary. Such alternative exemplary embodiments are contemplated to be within the scope of the present disclosure.

In an exemplary embodiment, context assignment and field recognition as described hereinabove with reference to blocks 230 and 240 may be jointly performed, e.g., the context and the fields may be jointly estimated according to a maximum a posteriori metric, etc., using templates having a pre-assigned context. Such alternative exemplary embodiments are contemplated to be within the scope of the present disclosure.

Once block 240 recognizes certain fields in digital image 220a, user designation block 250 of system 200 may further prompt for user designation of which recognized fields are to be manipulated by system 200, and/or how to manipulate those fields. In an exemplary embodiment, block 250 is configured to receive input from the user designating at least one of the one or more data fields recognized by block 240 for manipulation. System 200 may highlight the recognized fields in a graphical display for the user, and the user may directly select the desired fields. In alternative exemplary embodiments, system 200 may provide a series of check boxes in a graphical user interface to allow a user to designate any of the fields recognized by block 240 for further manipulation. In yet alternative exemplary embodiments, system 200 may allow the user to edit and/or modify the contents of any designated field, or to re-organize the layout of the fields. The user may further designate certain types of manipulation to be applied to certain designated fields, and other (different) types of manipulation to be applied to other designated fields.

At data/field manipulation block 260 (also denoted herein as a "data manipulation block"), system 200 performs context-specific manipulation on the one or more data fields designated by the user at block 250. In particular, given the assigned context 230*a*, block 260 may perform specific manipulations on the user-designated fields. Such manipulations may include generic operations, as well as operations that are pre-programmed specifically for the given contexts. In an exemplary embodiment, specific manipulations applied to the selected user-designated fields include generic manipulations such as displaying, modifying, removing, or editing the fields. Specific manipulations may also include performing calculations or data manipulation specific to the assigned context. For certain contexts, block 260 may further generate additional fields, e.g., fields not originally found in receipt 100, and superimpose such additional fields on top of the original image 220*a*.

Based on the manipulation performed at block 260, an image generation block 270 (also denoted herein as a "post-processing block") generates an output image 270*a*, also denoted herein as a "post-processed image." In an exemplary embodiment, certain user-designated fields may be displayed in a final image, while certain fields not selected by the user may be, e.g., blocked out, "greyed" out, scrambled, obscured, or otherwise excised from the output image. In alternative exemplary embodiments, user-designated fields may be bolded or otherwise highlighted for emphasis.

Note output image 270*a* may be generated in any of a plurality of formats selectable by the user. Subsequently, the user may take any desired actions on output image 270*a*, including printing, further editing (e.g., using a photo image editor), emailing, faxing, messaging, posting to social media sites, etc.

Note the blocks illustratively shown in FIG. 2 are not meant to suggest that any block necessarily precedes or follows any other block in a signal processing path. For example, in certain exemplary embodiments, data/field manipulation at block 260 may be alternatively or in conjunction performed prior to block 250 prompting for user designation. Such alternative exemplary embodiments are contemplated to be within the scope of the present disclosure.

Figure 3:
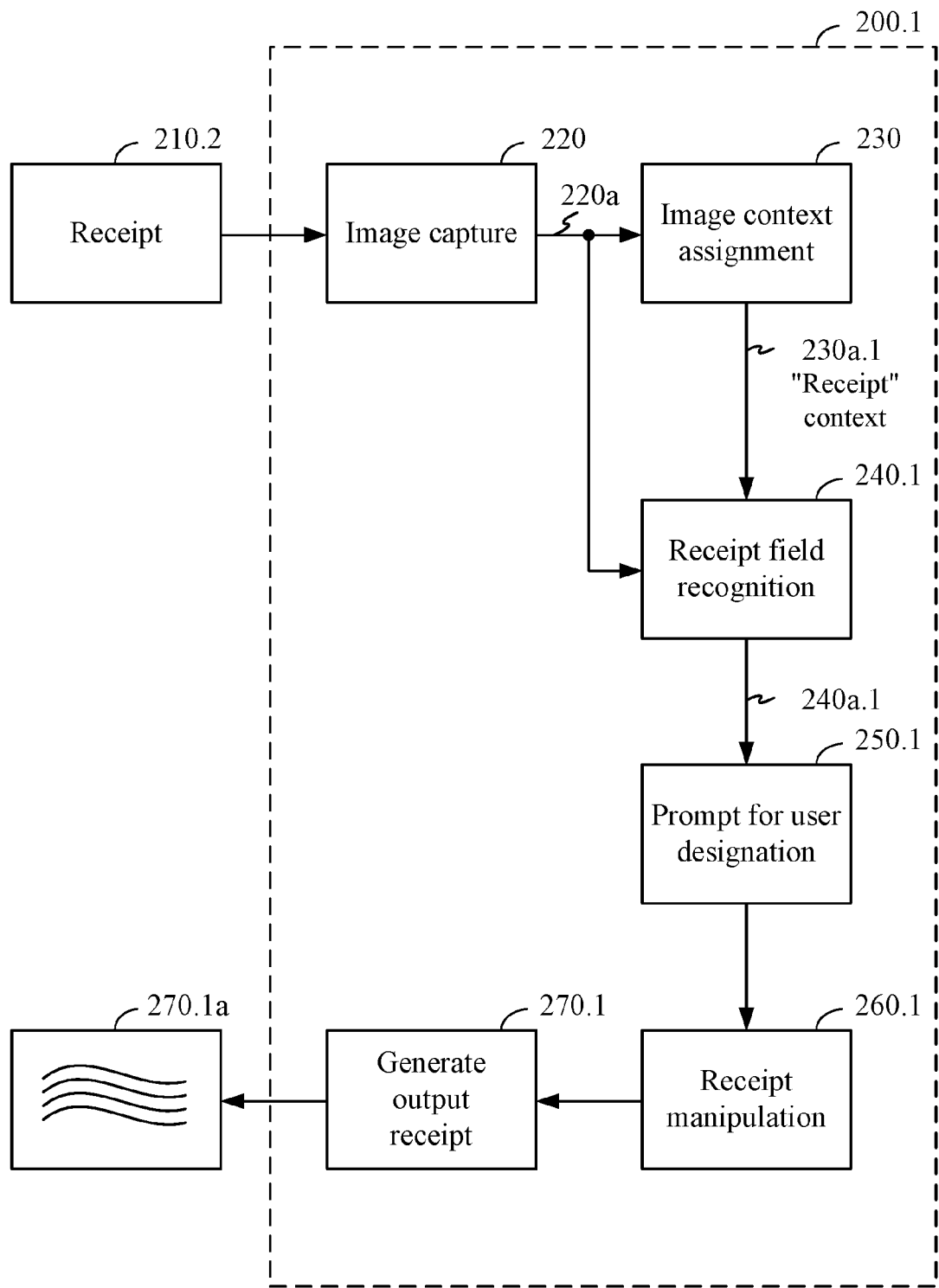
FIG. 3 illustrates an exemplary embodiment of an image processing system as applied to a specific receipt context.

FIG. 3 illustrates an exemplary embodiment 200.1 of system 200 as applied to a specific receipt context. FIGS. 4-8 further show illustrative diagrams of recognition and manipulation that may be performed by system 200.1. Note FIGS. 3-8 are shown for illustrative purposes only, and are not meant to limit the scope of the present disclosure to the specific receipt context shown herein. Further note that similarly labeled elements in FIGS. 2 and 3 may correspond to elements performing similar functions, unless otherwise noted. Note the presence in a label of ".1" in FIG. 3 may denote herein that such element containing ".1" corresponds to an exemplary embodiment of a similarly labeled element in FIG. 2.

In FIG. 3, a target object 210.1 is illustratively labeled as a receipt, and may correspond to, e.g., receipt 100 shown in FIG. 1. In the following description, certain text fields and formatting of the receipt 210.1 may be discussed with reference to characteristics described hereinabove with reference to receipt 100 of FIG. 1.

Following image capture 220 and context assignment 230, an assigned context 230*a*.1 corresponding to a "receipt" context is provided to field recognition block 240.1. Block 240.1 may perform recognition of fields specific to the receipt context, e.g., certain fields such as "items," "price," and "total" may be known to be commonly present in receipt contexts, and digital image 220*a* may be scanned for such fields. Note the correct formatting and identification of each field (e.g., text "Subtotal" preceding number "23.95" for subtotal field 440) may be derived by block 240.1 based on, e.g., the presence of pre-stored templates corresponding to the receipt context. For example, one template corresponding to the receipt context may specify that text corresponding to a "purchased item" is commonly found in the same row as text corresponding to a price (e.g., a number having a decimal point followed by two digits) of that item. Based on such context-specific cues, the fields of a receipt may be accurately recognized.

FIG. 4 shows an illustrative result 240*a*.1 of recognition performed by block 240.1 on digital image 220*a*. Note result 240*a*.1 is shown for illustrative purposes only to clarify the processing performed on digital image 220*a*, and is not meant to indicate that result 240*a*.1 need be presented or displayed to the user in any exemplary embodiment.

As shown in result 240*a*.1, block 240.1 recognizes text 110 of receipt 100 as corresponding to a "name" field 410 of a store, and text 120 as corresponding to an "address" field 420. Block 240.1 further recognizes separate rows corresponding to purchased items 130 of receipt 100, and recognizes fields 430, 432, 434, 436, 438 as corresponding to those purchased items. Based on the detected text formatting of digital image 220*a*, which may be ascertained using the reference "receipt" templates as described hereinabove, columns 422, 424, 426 are further recognized as corresponding to store-assigned identification numbers, names of the purchased items, and corresponding prices, respectively. Based on similar recognition techniques, the correct identities of fields 440, 442, 444, 446, 450, 460, 462, 464 may be ascertained and assigned.

At block 250.1, the user is prompted to designate which fields recognized at block 240.1 are to be displayed in an output receipt. For example, for an exemplary embodiment wherein check boxes are used for designation, FIG. 5 illustratively shows check boxes 510-564 that the user may select to designate which items to display. In the exemplary embodiment shown, for those fields that the user does not want to display in the output receipt, the user may, e.g., fill such box with an "X" symbol, or leave the corresponding boxes blank, as illustrated in FIG. 5. It will be appreciated that, to prompt the user for field designation, block 250.1 may automatically highlight certain of the fields in a graphical display to prompt for user selection, and/or superimpose check boxes (e.g., boxes 510, 520) next to the selectable fields.

In the illustrative scenario shown in FIG. 5, it is assumed that the user wants to generate an output receipt 100 showing only store identification information, batteries 138 that were purchased for a friend, and the subtotal, tax, and total information corresponding to just the batteries purchase. Accordingly, the user "checks" boxes 510, 520, 536, 540, 542, 544 corresponding to such fields of interest. Furthermore, boxes 530, 532, 534, 538, 546, 550, 560, 562, 564, corresponding to fields not of interest, are not checked by the user.

Figure 6:
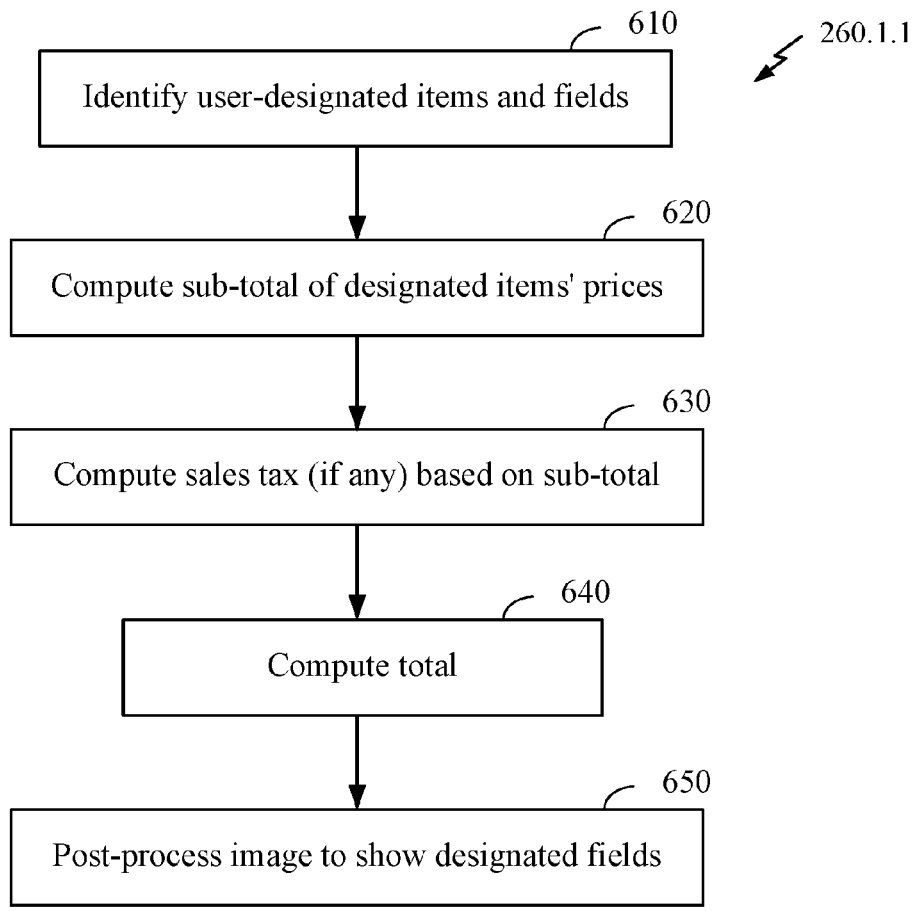

Following user designation of fields at block 250, data and field manipulation specific to the receipt context is performed at block 260.1. In particular, FIG. 6 illustrates an exemplary embodiment 260.1.1 of context-specific data manipulation for receipts that may be performed at block 260.1. Note FIG. 6 is shown for illustrative purposes only, and is not meant to limit the scope of the present disclosure to any particular types of data manipulation that can be performed for the receipt context.

In FIG. 6, at block 610, the items designated by the user are identified, along with corresponding prices. For example, in FIG. 5, the user-designated item is field 436, corresponding to "batteries" having a price of 6.99.

Figure 7:
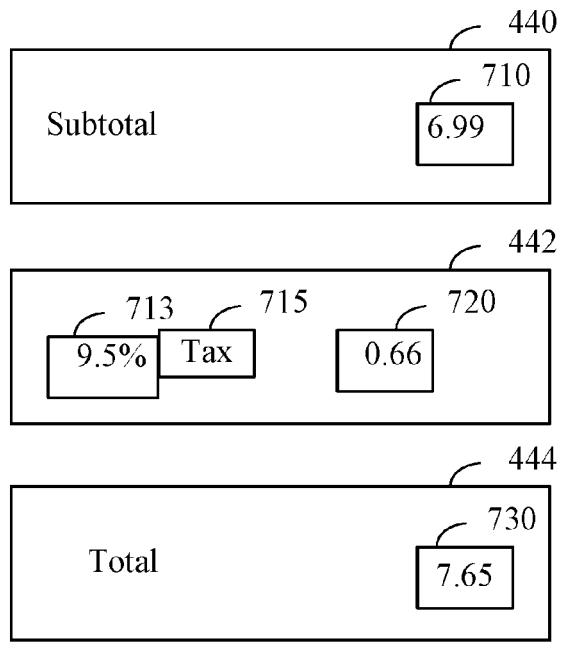

At block 620, the sub-total of the designated items' prices is calculated. For example, if only one item is designated, then the price of that item may be directly provided as the sub-total. If more than one item is designated, then the prices of all designated items may be summed and provided as the sub-total. FIG. 7 illustrates calculations that may be performed at block 620, showing a new field 710 that replaces the original sub-total (e.g., 23.95 at subtotal line 140 in FIG. 1) with the new subtotal 6.99 corresponding to only the batteries 138.

At block 630, based on the sub-total calculated at block 620, the sales tax is computed. For example, FIG. 7 shows the local sales tax rate of 9.5% in the "tax rate" field 713 on the receipt, which is recognized by system 200 as the sales tax to use for the computation at block 630.

In an exemplary embodiment, the sales tax information may be directly obtained from the sales tax field 442 of recognized image 240a.1 in FIG. 4. In alternative exemplary embodiments, other techniques may be used to determine an appropriate sales tax, e.g., if such information is not explicitly shown in target object 210. For example, the locale of a purchase may be determined with reference to the address field of the receipt, or by a Global Positioning System (GPS) module accessible by system 200, or based on geocoding associated with digital image 220a, and/or information regarding the local sales tax may be obtained via, e.g., a locally stored or Internet-accessible database based on the determined locale. It will be appreciated that any known techniques for deriving local information, e.g., sales tax or other location-dependent parameters used by block 260, are contemplated to be within the scope of the present disclosure.

As shown in FIG. 7, the sales tax is computed to be 0.66 at field 720, corresponding to the multiplicative product of 6.99 in the subtotal field 710 and the rate 9.5% in the tax rate field 713. Note the value of field 720 is different from the value of field 142 in the original receipt 100 in FIG. 1, as only one item 138 of the list 130 was selected. Accordingly, during post-processing of the image, e.g., as later described hereinbelow with reference to FIG. 8, the original field 142 may be modified to display the system-calculated sales tax instead of the original sales tax.

At block 640, the selected item's price and sales tax are added to obtain the total. For example, FIG. 7 shows the total price of 7.65 in field 730, based on adding the sub-total 710 to the sales tax 720.

At block 650, digital image 220a is post-processed to generate an output representation showing the originally designated fields, along with the processed data corresponding to those fields. In alternative exemplary embodiments, additional fields not corresponding to user-designated fields may additionally be generated and superimposed onto digital image 220a.

Further at block 650, the image data corresponding to certain fields not designated by the user, e.g., fields 430, 432, 434, 438 and fields 446, 450, 460, 462, 464, may be manipulated to obscure those fields in the final output receipt 270.1a.

Returning to FIG. 3, following block 260.1 in which the user-designated fields, including subtotal 710, sales tax 720, and total 730 are computed and updated, block 270.1 generates the final output or post-processed version 270.1a of the receipt. In an exemplary embodiment, block 270.1 may receive the manipulated data from block 260.1 and generate the output receipt 270.1a in a format selectable by the user. For example, possible formats for output receipt 270.1a may include, e.g., well-known digital formats such as PDF, JPG, BMP, etc., or traditional paper formats such as a print-out.

Figure 8:
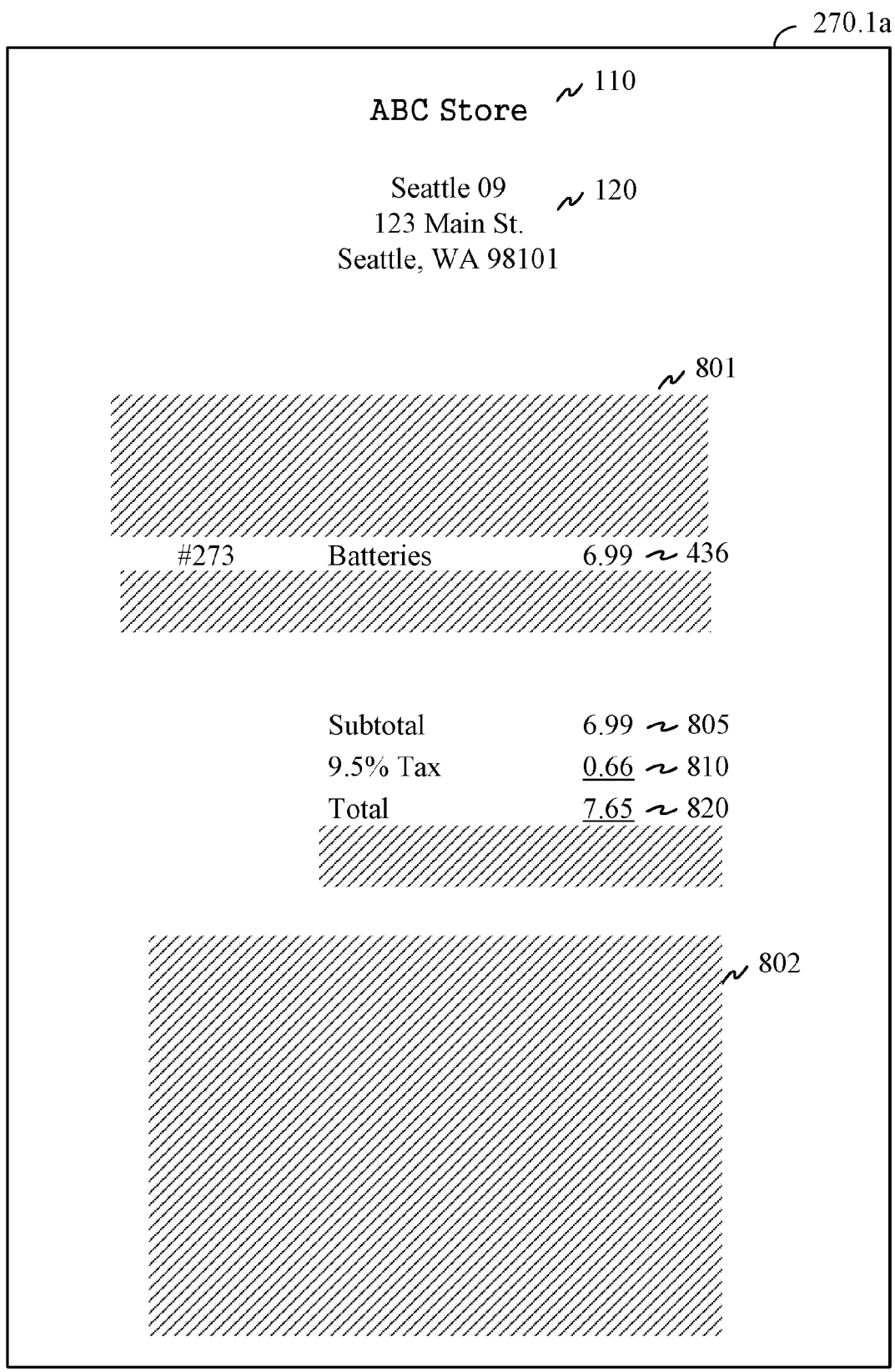

FIG. 8 illustrates an output receipt 270.1a based on the illustrative parameters described with reference FIGS. 4, 5, and 7. Note FIG. 8 is shown for illustrative purposes only, and is not meant to limit output receipt 270.1a to any particular format shown. In alternative exemplary embodiments, different versions of output receipt 270.1a, e.g., showing additional or different fields, different text formatting, different modes of obscuring certain fields, text, or images, etc., may be generated. Such alternative exemplary embodiments are contemplated to be within the scope of the present disclosure.

In FIG. 8, the item price field 436 is displayed, as per user designation. Subtotal 805 is shown as directly corresponding to item price field 436, since only one item was designated. Sales tax 810 is further shown, and corresponds to field 720 as calculated by block 630. Total 820 is shown, and corresponds to field 730 calculated by block 640.

Note the fields not designated by the user, e.g., fields 430, 432, 434, 438 and fields 446, 450, 460, 462, 464, are shown as obscured or "scrambled out" in output receipt 270.1a.

It will be appreciated that similar processing as described hereinabove with reference to the receipt context of FIGS. 3-8 may be applied by system 200 of FIG. 2 to other contexts as well. For example, in an alternative usage scenario, a first user may desire to share a document, such as a personal tax form, with a second user, taking care to remove any personal data the first user does not want displayed. In such a scenario, the target object 210 processed by system 200 may correspond to the tax form. In an exemplary embodiment, system 200 may recognize the context of the image as corresponding to a "tax form" context, and proceed to process the image using techniques similar to those described hereinabove with reference to, e.g., FIGS. 3-8.

For example, system 200 may prompt the user to designate certain fields in the tax form as fields of interest. In an exemplary embodiment, block 260 of system 200 may randomize or scramble the content of certain fields not designated by the user for display. For example, the pre-existing content of the designated fields may be replaced with random numbers, so as to maintain the privacy of the user. Appropriate update calculations may be performed on non-obscured fields, if designated by the user. The output can then be shared, e.g., as a post-processed image output 270a.

Figure 9:
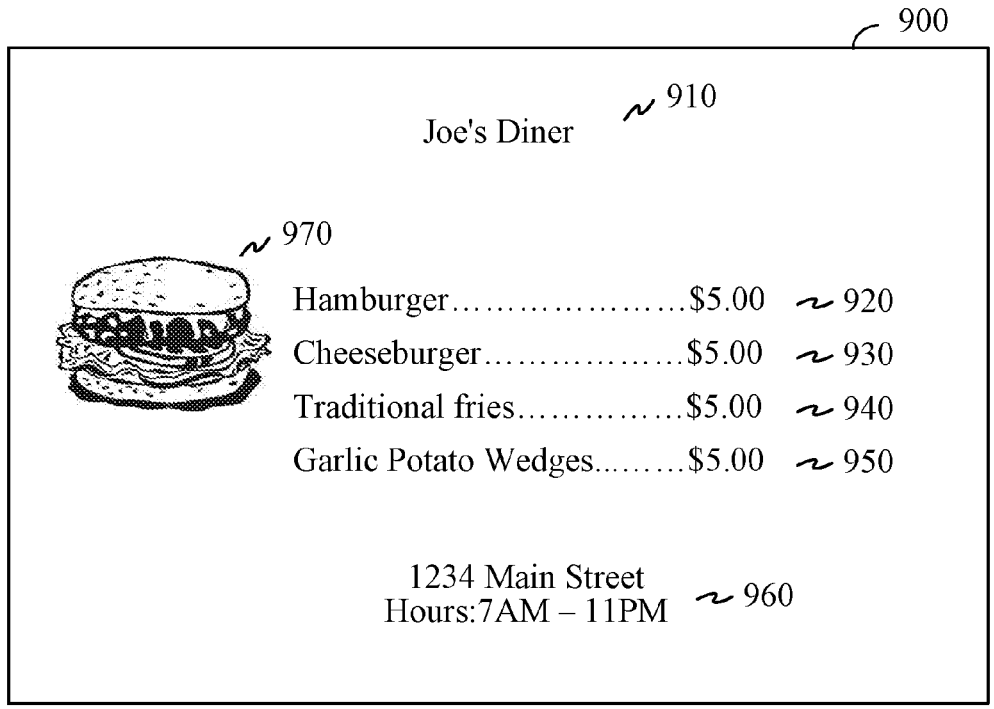
FIGS. 9 and 10 illustrate an alternative exemplary embodiment of the present disclosure showing processing that may be performed specifically for a "restaurant menu" context.
Figure 10:
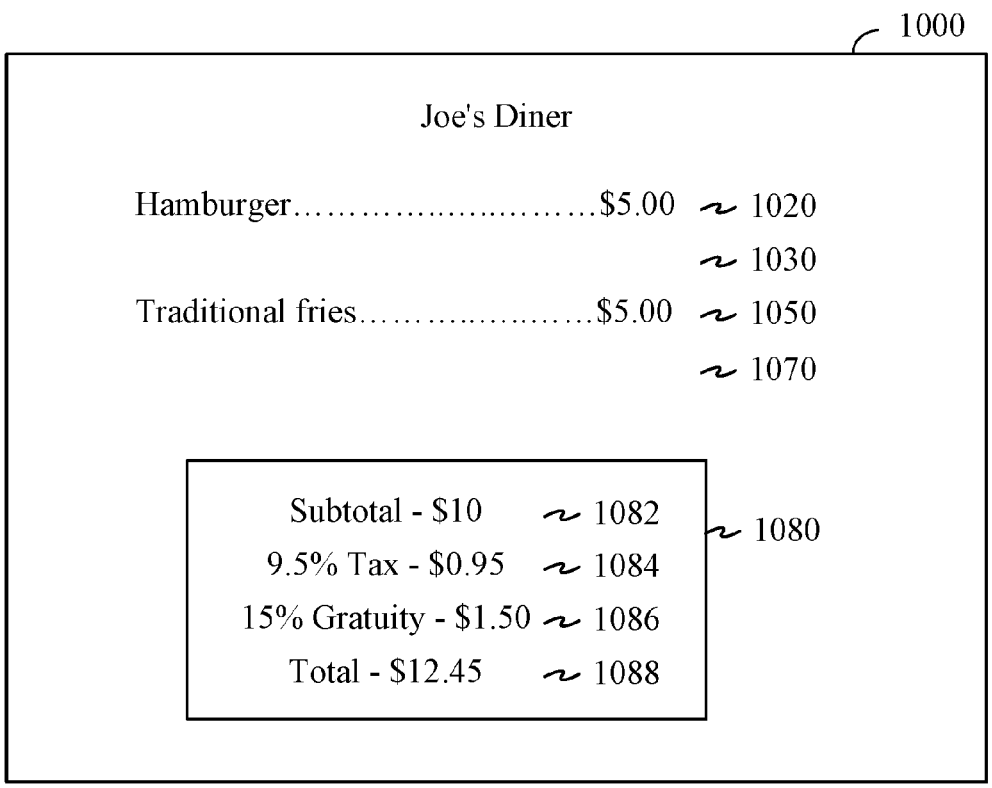

FIGS. 9 and 10 illustrate an alternative exemplary embodiment of the present disclosure showing processing that may be performed specifically for a "restaurant menu" context. Note for ease of illustration, description of certain processing similar to that performed for the receipt context of FIGS. 3-8 is omitted herein.

In a sample usage scenario, a user dining at a restaurant may take a picture of a menu 900 to share with friends. In the illustrative menu 900, text 910 and 960 correspond to identifying restaurant information, while lines 920, 930, 940, 950 correspond to food items and prices. A graphic 970 corresponds to a picture or drawing of a particular menu item.

In an exemplary embodiment, following image capture/OCR by block 220 of FIG. 2, system 200 may recognize the context of digital image 220a as a "restaurant menu," and proceed to identify the fields in digital image 220a at block 240, e.g., by checking against pre-existing restaurant menu templates. System 200 may further prompt for user designation as to which fields are to be manipulated, and/or how the recognized fields are to be manipulated, e.g., as described with reference to block 250.

Following user designation of fields, block 260 may perform data/field manipulation by adding the prices of the designated items, and, e.g., automatically computing the tax, gratuity, and total price. FIG. 10 shows an illustrative post-processed output 1000, for the illustrative scenario in which the user selected Hamburger 920 and Traditional Fries 950, which are correspondingly displayed as fields 1020 and 1050. Note fields 1030, 1070, shown as blank spaces in output 1000, may correspond to items 930, 950 not designated for display by the user.

Further shown in FIG. 10 is a superimposed block 1080 that may be generated, e.g., by block 260 specifically for a restaurant menu context. In particular, block 1080 includes a subtotal field 1082 showing the subtotal of the user-selected food items. A sales tax 1084 is computed, e.g., with local sales tax rates determined from GPS information or user input. A gratuity 1086 is also computed, e.g., based on user input or other predetermined information. A total 1088 is computed by adding subtotal 1082, sales tax 1084, and gratuity 1086. It is noted that block 1080 may be autonomously inserted by block 260 into output 1000, e.g., without explicit designation by the user. Such autonomous action may be, e.g., specifically performed by system 200 in a restaurant menu context, based on, e.g., context-specific programming performed by block 260.

Note for the restaurant menu context and other contexts in general, block 260 may autonomously generate certain fields such as block 1080 even in the absence of explicit user designation. In particular, additional data fields not originally present in digital image 220a may at any time be generated and superimposed onto the digital image 220a. Such additional data fields may be generally inserted, or specific to a given context, and thus may represent data fields that are commonly useful to the user in certain contexts. Such alternative exemplary embodiments are contemplated to be within the scope of the present disclosure.

Figure 11:
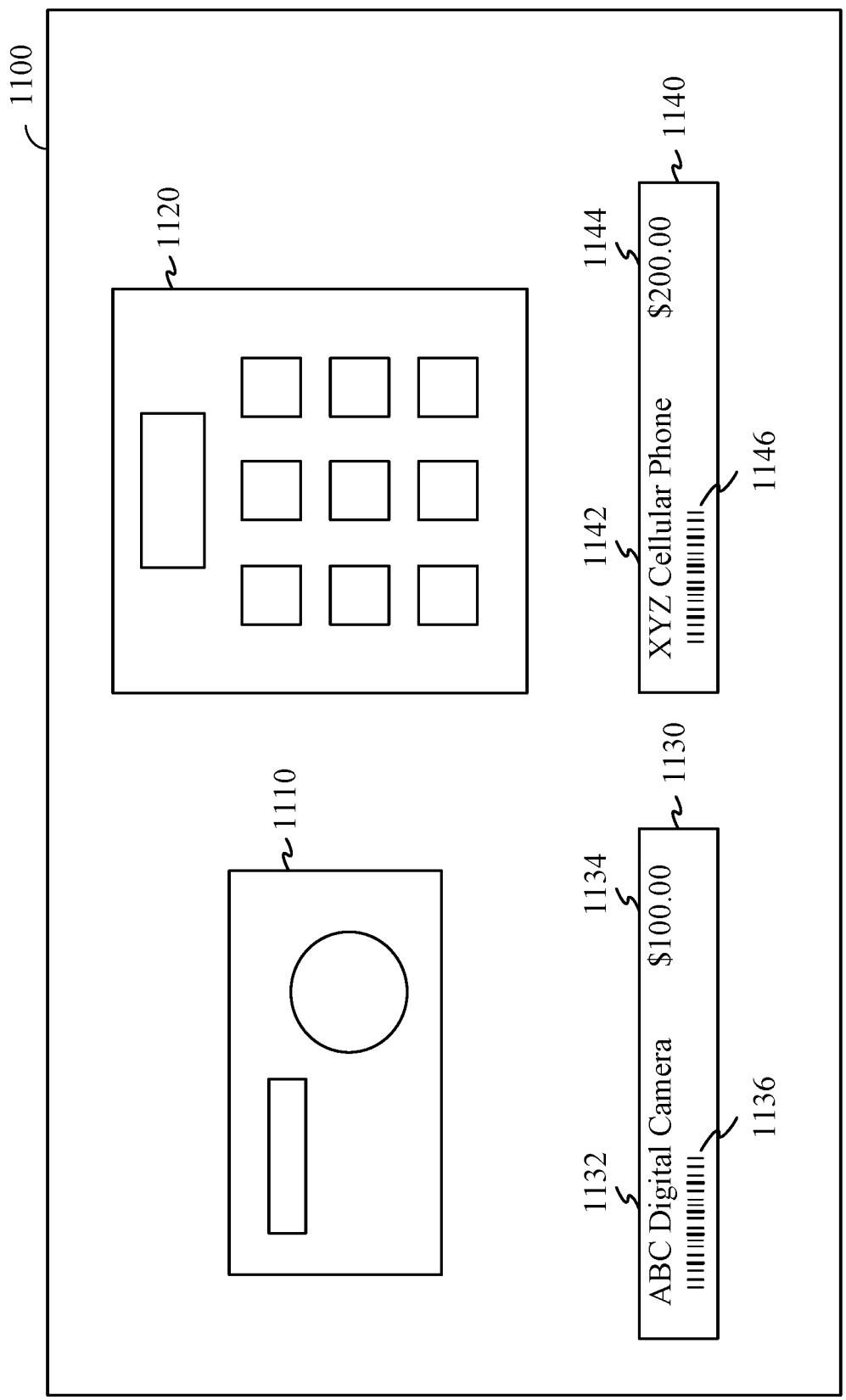
Figure 13:
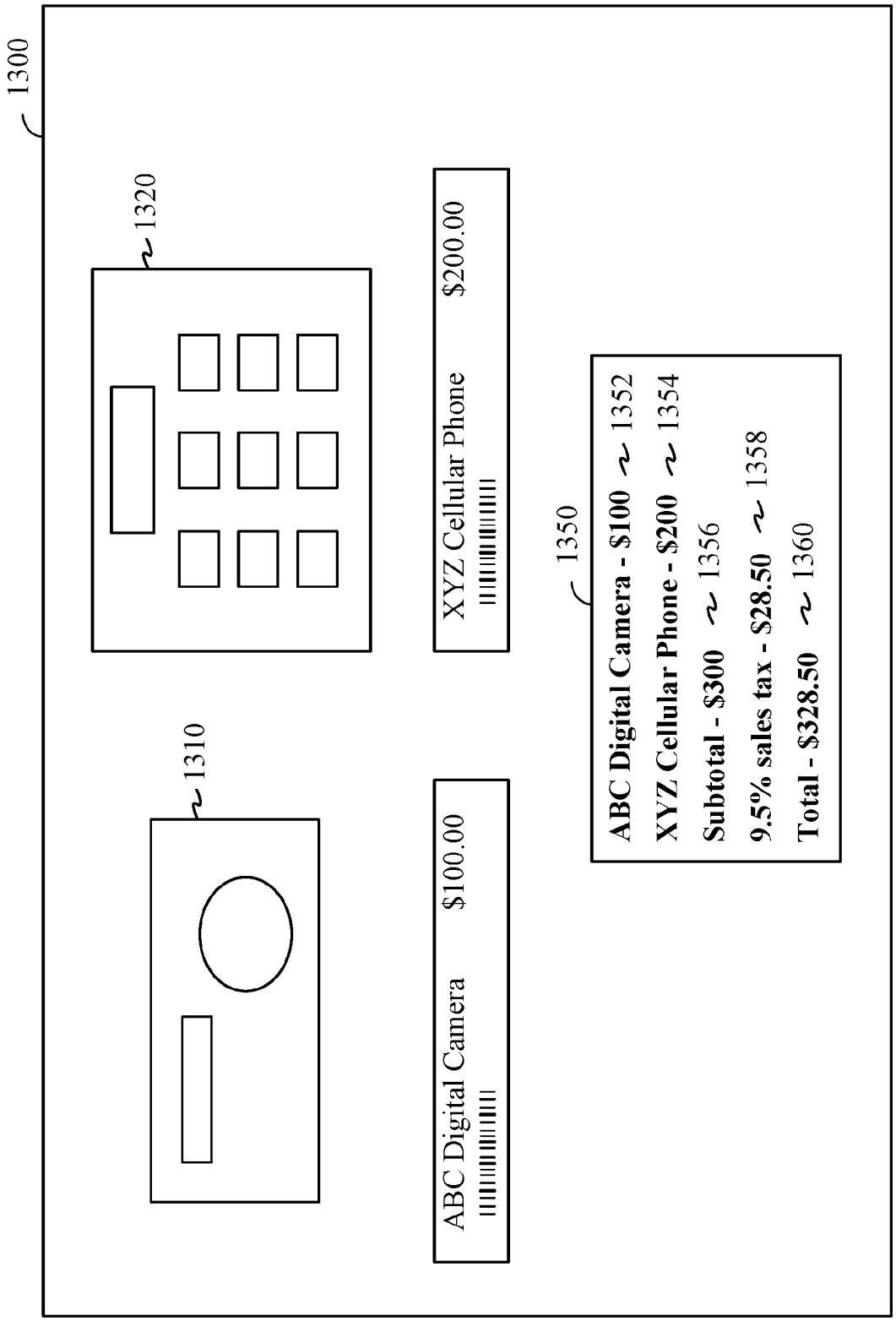

FIGS. 11-13 illustrate an alternative exemplary embodiment of the present disclosure showing processing that may be performed specifically for a "store shelf" context. Note for ease of illustration, description of certain processing similar to that performed for the receipt context of FIGS. 3-8 is omitted herein.

In a sample usage scenario, a user shopping at a store may take a picture 1100 of a store shelf showing items considered for purchase. In the illustrative shore shelf picture 1100, a camera 1110 and a cell phone 1120 are displayed side-by-side, along with corresponding price tags 1130, 1140. In particular, price tags 1130, 1140 may include respective item names 1132, 1142, prices 1134, 1144, barcodes 1136, 1146, etc.

In an exemplary embodiment, following image capture/OCR by block 220 of FIG. 2, system 200 at block 230 may assign context 230a to digital image 220a corresponding to a "store shelf," and proceed to identify the fields in digital image 220a at block 240, e.g., by checking against pre-existing restaurant store shelf and/or price tag templates. Based on field recognition performed at block 240, system 200 may recognize that image fields corresponding to items 1110, 1120 are matched to corresponding price tags 1130, 1140.

At block 250, system 200 may prompt for user designation of user-designated fields. For example, the user may select the digital camera 1110, the cell phone 1120, and price tags 1130, 1140 for display in the output image. Alternatively, specifically for the store shelf context, mere user selection of the fields corresponding to tags 1130, 1140 may indicate that all associated fields, including the images of camera 1110 and cell phone 1120, are to be displayed in the output (notwithstanding the lack of explicit designation by the user of those fields for display). Block 260 may add the subtotals of prices of the selected items, and further compute the tax and total, according to data manipulation techniques previously described hereinabove.

It will be appreciated that local sales tax information as utilized at block 260 may be determined using various techniques. In an exemplary embodiment, picture 1100 may be a geocoded image, or an image containing digital information about the location where the picture was captured, e.g., using a cellular phone or other position-aware device. In an exemplary embodiment, system 200 may be configured to decode latitude/longitude information from the geocoding, and thereby determine the correct local sales tax rate. For example, if it is determined that picture 1100 of an item is taken in Portland, Oreg., where the current local sales tax is 0%, then the appropriate sales tax rate may be set as 0% by default. In an exemplary embodiment, block 250 may accept further user input, e.g., to modify or otherwise update default parameters set by system 200 (such as the default sales tax rate), if applicable.

In an alternative exemplary embodiment, if no geocoding is available for image 1100, block 250 may directly prompt the user to enter the appropriate sales tax.

In an exemplary embodiment, geocoding of a captured image may be utilized to assign an appropriate context to an image, e.g., at block 230 of system 200. For example, if a picture is determined to be of a store shelf geocoded with location information, then image context assignment block 230 may assign a location-dependent context, e.g., "Portland, Oreg. Store Shelf," to image 220a, and process accordingly.

While FIG. 11 illustrates a scenario wherein the user takes a single picture 1100 of two items 1110, 1120, other usage scenarios may occur wherein a user separately takes photos of multiple items considered for purchase, as shown in FIG. 12. For example, a user could be in one area of the store when a first picture 1210 of item 1110 is taken, and in another area of the store when a second picture 1220 of item 1120 is taken. In an exemplary embodiment, system 200 may accommodate scenarios wherein two or more separately taken pictures are designated to be combined by the system. For example, an exemplary embodiment of block 220 may prompt for user designation of multiple digital images to be combined into a single composite digital image 220a, on which subsequent processing may be performed.

System 200 may further utilize geocoding (if available) of images 1210, 1220 to determine appropriate sales tax and/or other location-dependent parameters for calculation, as described hereinabove. Such alternative exemplary embodiments are contemplated to be within the scope of the present disclosure.

FIG. 13 shows an illustrative post-processed output 1300, for the illustrative scenario in which the user designates both items 1110, 1120 for data manipulation. In the exemplary embodiment shown, system 200 performs the sales tax computations and generates a text block 1350 to be superimposed on the original digital image 220a. Note block 1350 includes for display the original images 1310, 1320 of the items considered for purchase, item identification information lines 1352, 1354, and further computed price and sales tax information fields 1356, 1358, 1360. Note the information and format of data to be displayed in the superimposed block 1350 may be specifically associated by system 200 with a store shelf context.

Figure 14:
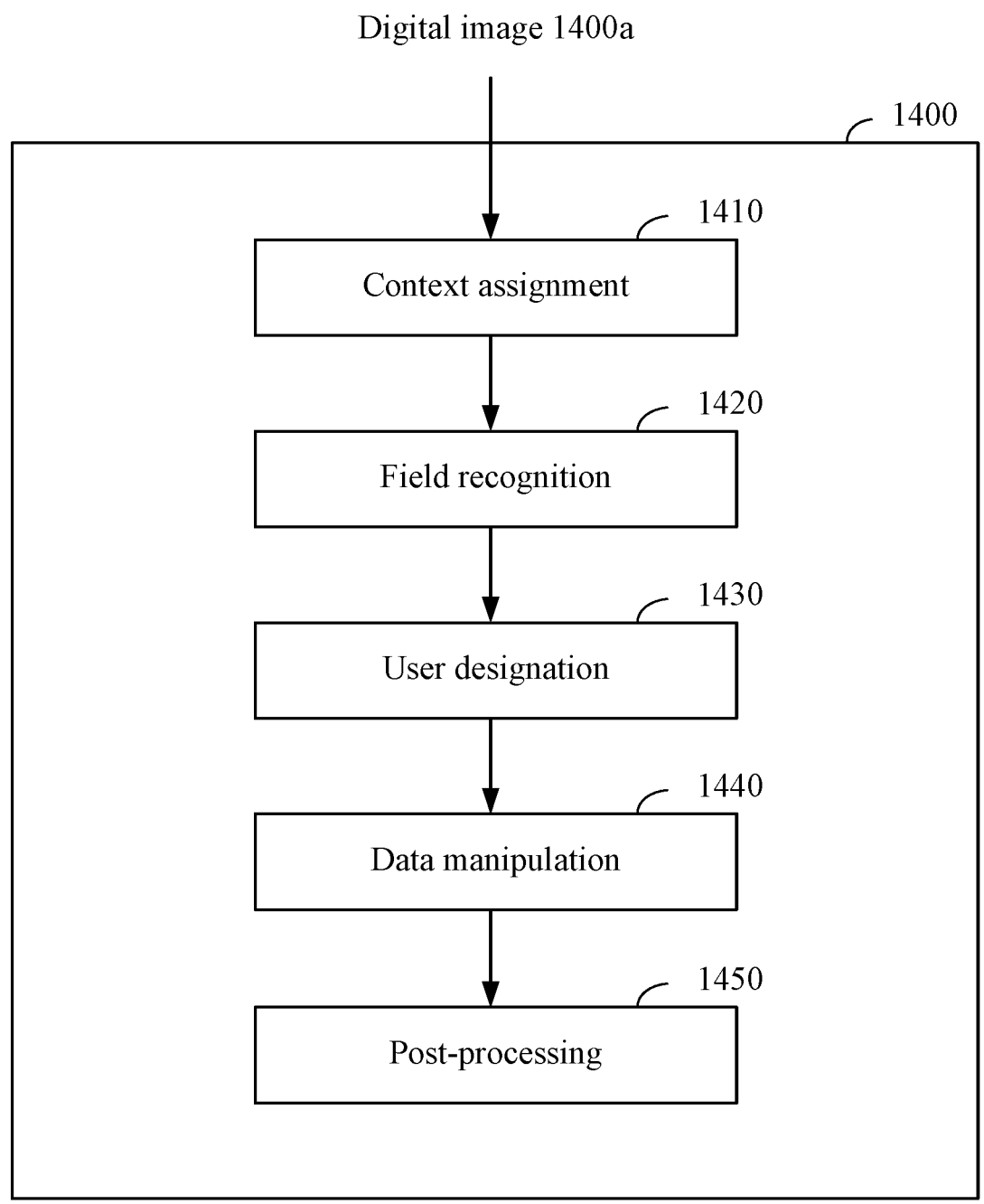
FIG. 14 illustrates an exemplary embodiment of an apparatus according to the present disclosure.

FIG. 14 illustrates an exemplary embodiment of an apparatus 1400 according to the present disclosure. Note FIG. 14 is shown for illustrative purposes only, and is not meant to limit the scope of the present disclosure to any particular apparatus shown.

In FIG. 14, a context assignment block 1410 is configured to assign a context to the digital image. The context may be selected from a plurality of predetermined contexts.

A field recognition block 1420 is configured to recognize one or more data fields in the digital image.

A user designation block 1430 is configured to receive input from the user designating at least one of the one or more recognized data fields for manipulation.

A data manipulation block 1440 is configured to manipulate the at least one user-designated data field based on the assigned context of the digital image.

A post-processing block 1450 is configured to generate the output image based on the at least one manipulated data field.

Figure 15:
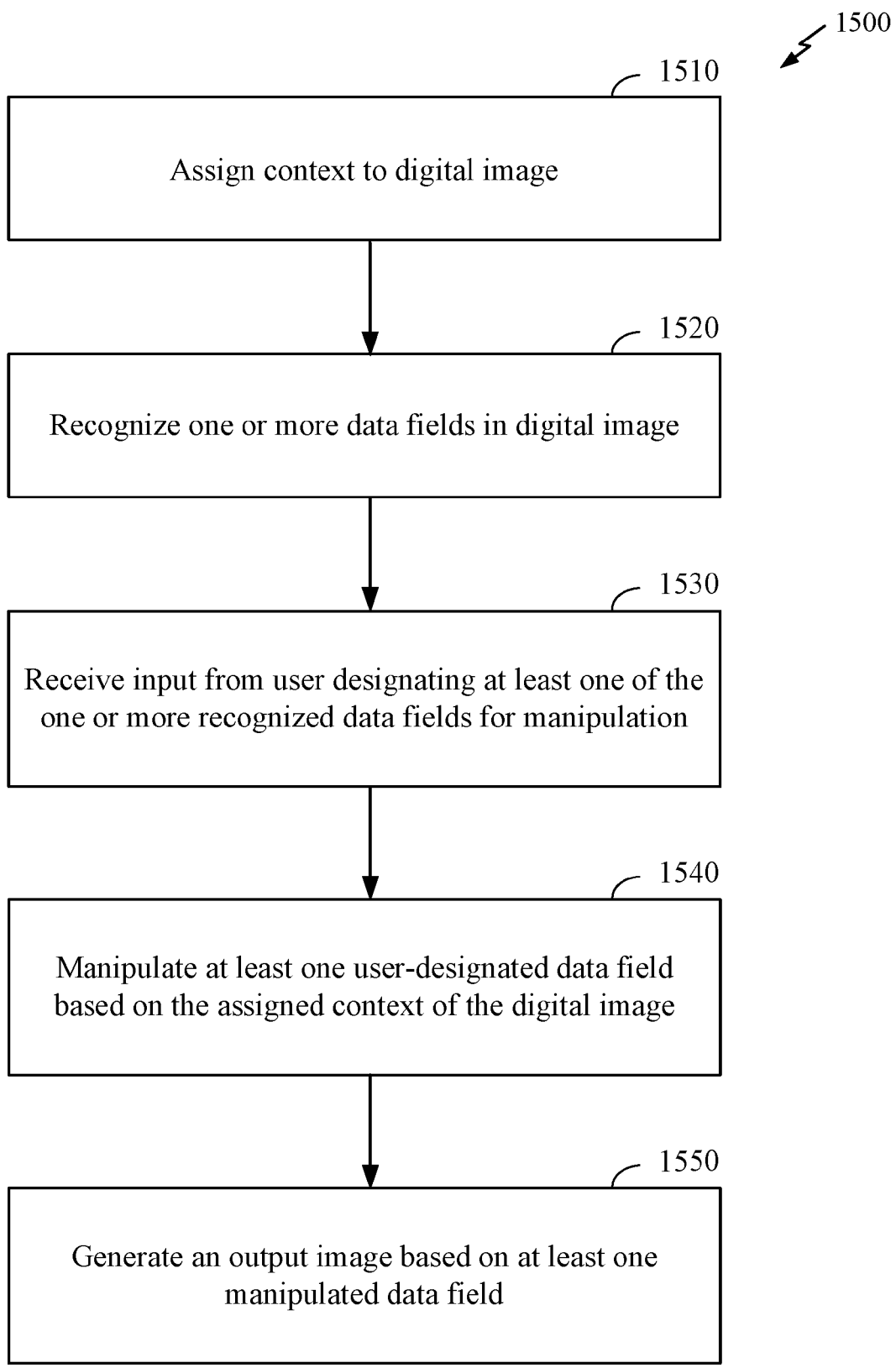
FIG. 15 illustrates an exemplary embodiment of a method according to the present disclosure.

FIG. 15 illustrates an exemplary embodiment of method 1500 according to the present disclosure. Note FIG. 15 is shown for illustrative purposes only, and is not meant to limit the scope of the present disclosure to any particular method shown.

At block 1510, a context is assigned to the digital image. The context may be selected from a plurality of predetermined contexts.

At block 1520, one or more data fields in the digital image is recognized.

At block 1530, input is received from the user designating at least one of the one or more recognized data fields for manipulation.

At block 1540, at least one user-designated data field is manipulated based on the assigned context of the digital image.

At block 1550, an output image is generated based on at least one manipulated data field.

Figure 16:
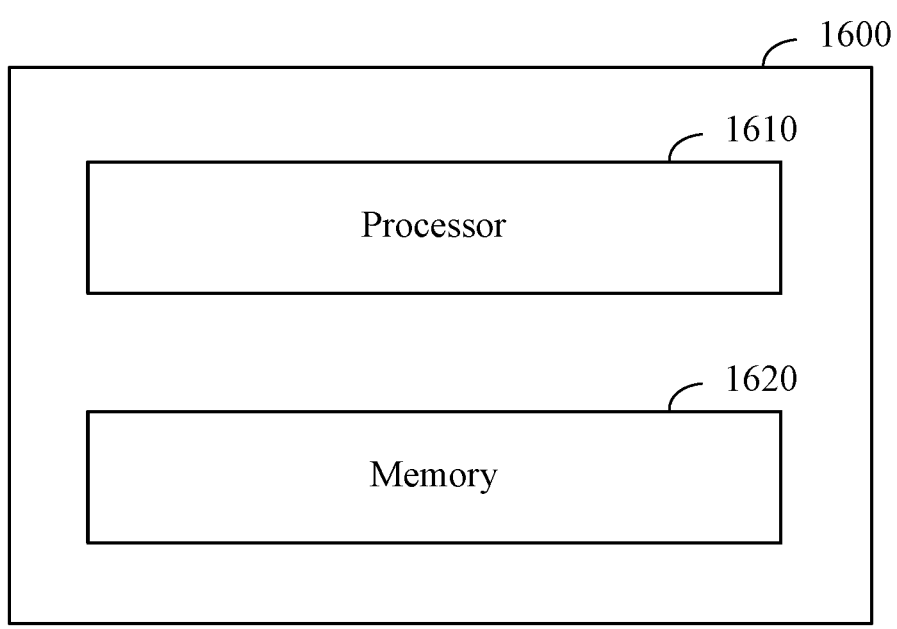
FIG. 16 schematically shows a non-limiting computing system that may perform one or more of the above described methods and processes.

FIG. 16 schematically shows a non-limiting computing system 1600 that may perform one or more of the methods and processes described hereinabove. Computing system 1600 is shown in simplified form. It is to be understood that virtually any computer architecture may be used without departing from the scope of this disclosure. In different embodiments, computing system 1600 may take the form of a mainframe computer, server computer, cloud computing system, desktop computer, laptop computer, tablet computer, home entertainment computer, network computing device, mobile computing device, mobile communication device, smartphone, gaming device, etc.

Computing system 1600 includes a processor 1610 and a memory 1620. Computing system 1600 may optionally include a display subsystem, communication subsystem, sensor subsystem, camera subsystem, and/or other components not shown in FIG. 16. Computing system 1600 may also optionally include user input devices such as keyboards, mice, game controllers, cameras, microphones, and/or touch screens, for example.

Processor 1610 may include one or more physical devices configured to execute one or more instructions. For example, the processor may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The processor may include one or more processors that are configured to execute software instructions. Additionally or alternatively, the processor may include one or more hardware or firmware logic machines configured to execute hardware or firmware instructions. Processors of the processor may be single core or multicore, and the programs executed thereon may be configured for parallel or distributed processing. The processor may optionally include individual components that are distributed throughout two or more devices, which may be remotely located and/or configured for coordinated processing. One or more aspects of the processor may be virtualized and executed by remotely accessible networked computing devices configured in a cloud computing configuration.

Memory 1620 includes one or more physical devices configured to hold data and/or instructions executable by the processor to implement the methods and processes described herein. When such methods and processes are implemented, the state of memory 1620 may be transformed (e.g., to hold different data). Memory 1620 may include removable media and/or built-in devices, such as computer-readable storage media. Memory 1620 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Memory 1620 may include devices with one or more of the following characteristics: volatile, nonvolatile, dynamic, static, read/write, read-only, random access, sequential access, location addressable, file addressable, and content addressable. In some embodiments, processor 1610 and memory 1620 may be integrated into one or more common devices, such as an application specific integrated circuit or a system on a chip.

It is to be appreciated that memory 1620 includes one or more physical devices that stores information. The terms "module," "program," and "engine" may be used to describe an aspect of computing system 1600 that is implemented to perform one or more particular functions. In some cases, such a module, program, or engine may be instantiated via processor 1610 executing instructions held by memory 1620. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

In an aspect, computing system 1600 may correspond to a computing device including a memory 1620 holding instructions executable by a processor 1610 to: assign a context to the digital image, the context selected from a plurality of predetermined contexts; recognize one or more data fields in the digital image; receive input from the user designating at least one of the one or more recognized data fields for manipulation; manipulate the at least one user-designated data field based on the assigned context of the digital image; and generate the output image based on the at least one manipulated data field.

An aspect of the present disclosure provides an apparatus comprising: a context assignment block configured to assign a context to the digital image, the context selected from a plurality of predetermined contexts; a field recognition block configured to recognize one or more data fields in the digital image; a user designation block configured to receive input from the user designating at least one of the one or more recognized data fields for manipulation; a data manipulation block configured to manipulate the at least one user-designated data field based on the assigned context of the digital image; and a post-processing block configured to generate the output image based on the at least one manipulated data field.

Another aspect of the present disclosure provides a method comprising: assigning a context to the digital image, the context selected from a plurality of predetermined contexts; recognizing one or more data fields in the digital image; receiving input from the user designating at least one of the one or more recognized data fields for manipulation; manipulating the at least one user-designated data field based on the assigned context of the digital image; and generating the output image based on the at least one manipulated data field.

Yet another aspect of the present disclosure provides a computing device including a processor and a memory holding instructions executable by the processor to: assign a context to the digital image, the context selected from a plurality of predetermined contexts; recognize one or more data fields in the digital image; receive input from the user designating at least one of the one or more recognized data fields for manipulation; manipulate the at least one user-designated data field based on the assigned context of the digital image; and generate the output image based on the at least one manipulated data field.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. An apparatus for generating an output image from at least one digital image, the apparatus comprising:
    a field recognition block configured to digitally recognize one or more data fields in the at least one digital image;
    a context assignment block configured to assign a context to the at least one digital image by correlating the digitally recognized one or more data fields with a plurality of predetermined context-specific templates;
    a user designation block configured to receive input from the user designating at least one of the one or more recognized data fields;
    a data manipulation block configured to automatically compute additional data fields based on the assigned context and the designated at least one of the one or more recognized data fields; and
    a post-processing block configured to generate the output image by superimposing the computed additional data fields onto the at least one digital image.

2. The apparatus of claim 1, the plurality of predetermined context-specific templates comprising at least one template corresponding to a restaurant menu, the digitally recognized one or more data fields corresponding to menu items and prices as specified by the at least one template corresponding to a restaurant menu, and the user designation block configured to receive input from the user designating at least one of the menu items and prices, the computed additional data fields comprising a sub-total field, a tax field, a gratuity field, or a total price field.

3. The apparatus of claim 1, the plurality of predetermined context-specific templates comprising at least one template corresponding to a store shelf, the digitally recognized one or more data fields corresponding to a plurality of items for purchase and corresponding prices as specified by the at least one template corresponding to a store shelf, and the user designation block configured to receive input from the user designating at least one of the plurality of items for purchase, the computed additional data fields comprising a sub-total field, a tax field, or a total price field.

4. The apparatus of claim 3, the at least one digital image comprising a plurality of images, the output image comprising the plurality of images displayed in a single image, the sub-total field comprising a sum of recognized data fields corresponding to price extracted from each of the plurality of images.

5. The apparatus of claim 4, each of the plurality of images being assigned the same context.

6. The apparatus of claim 3, the received input from the user designating at least one of the plurality of items for purchase comprising designation of the digitally recognized one or more data fields corresponding to prices.

7. The apparatus of claim 1, the apparatus comprising a mobile communications device comprising a camera, the at least one digital image being generated by the camera.

8. The apparatus of claim 1, the computed additional fields comprising a calculated sales tax field.

9. The apparatus of claim 8, the at least one digital image comprising geographical information identifying location of where each image was captured, the sales tax field being calculated based on a sales tax rate corresponding to the identified location.

10. The apparatus of claim 8, the user designation block further configured to receive input from the user designating a sales tax rate to be used when calculating the sales tax field.

11. A method comprising:
digitally recognizing one or more data fields in at least one digital image;
assigning a context to the at least one digital image by correlating the digitally recognized one or more data fields with a plurality of predetermined context-specific templates;
receiving input from a user designating at least one of the one or more recognized data fields;
automatically computing additional data fields based on the assigned context and the designated at least one of the one or more recognized data fields; and
generating an output image by superimposing the computed additional data fields onto the at least one digital image.

12. The method of claim 11, the plurality of predetermined context-specific templates comprising at least one template corresponding to a restaurant menu, the digitally recognized one or more data fields corresponding to menu items and prices as specified by the at least one template corresponding to a restaurant menu, and the receiving the input from the user comprising receiving user designation of at least one of the menu items and prices, the computed additional data fields comprising a sub-total field, a tax field, a gratuity field, or a total price field.

13. The method of claim 11, the plurality of predetermined context-specific templates comprising at least one template corresponding to a store shelf, the digitally recognized one or more data fields corresponding to a plurality of items for purchase and corresponding prices as specified by the at least one template corresponding to a store shelf, and the receiving the input from the user comprising receiving user designation at least one of the plurality of items for purchase, the computed additional data fields comprising a sub-total field, a tax field, or a total price field.

14. The method of claim 11, further comprising generating the at least one digital image using a digital camera coupled to a mobile communications device.

15. The method of claim 11, the computed additional fields comprising a calculated sales tax field.

16. The method of claim 15, the at least one digital image comprising geographical information identifying location of where each image was captured, the sales tax field being calculated based on a sales tax rate corresponding to the identified location.

17. The method of claim 15, the receiving the input from the user further comprising receiving user designation of a sales tax rate to be used when calculating the sales tax field.

18. A computing device including a processor and a memory holding instructions executable by the processor to:
digitally recognize one or more data fields in at least one digital image;
assign a context to the at least one digital image by correlating the digitally recognized one or more data fields with a plurality of predetermined context-specific templates;
receive input from a user designating at least one of the one or more recognized data fields;
automatically compute additional data fields based on the assigned context and the designated at least one of the one or more recognized data fields; and
generate an output image by superimposing the computed additional data fields onto the at least one digital image.

19. The device of claim 18, the plurality of predetermined context-specific templates comprising at least one template corresponding to a restaurant menu, the digitally recognized one or more data fields corresponding to menu items and prices as specified by the at least one template corresponding to a restaurant menu, and the instructions executable by the processor to receive the input from the user comprising instructions executable by the processor to receive user designation of at least one of the menu items and prices, the computed additional data fields comprising a sub-total field, a tax field, a gratuity field, or a total price field.

20. The device of claim 18, the plurality of predetermined context-specific templates comprising at least one template corresponding to a store shelf, the digitally recognized one or more data fields corresponding to a plurality of items for purchase and corresponding prices as specified by the at least one template corresponding to a store shelf, and the instructions executable by the processor to receive the input from the user comprising instructions executable by the processor to receive user designation at least one of the plurality of items for purchase, the computed additional data fields comprising a sub-total field, a tax field, or a total price field.

* * * * *